March 10, 1970  E. E. CRIST ET AL  3,499,221
DRYER AND CONVEYER APPARATUS FOR COATED MATERIALS
Original Filed Oct. 5, 1967  4 Sheets-Sheet 1

LYMAN B FURRY
EARL E CRIST
   *INVENTOR.* their attorney

LYMAN B. FURRY
EARL E CRIST
INVENTOR.

their attorney

LYMAN B FURRY
EARL E CRIST
*INVENTOR.*

United States Patent Office 3,499,221
Patented Mar. 10, 1970

3,499,221
DRYER AND CONVEYER APPARATUS FOR
COATED MATERIALS
Earl E. Crist, 806 Morris, Washington, Ill. 61571, and
Lyman B. Furry, 15 N. Alexander, Danville, Ill. 61832
Original application Oct. 5, 1967, Ser. No. 673,179.
Divided and this application Aug. 12, 1968, Ser. No. 751,888
Int. Cl. F26b 13/02, 3/04, 13/20
U.S. Cl. 34—156           1 Claim

ABSTRACT OF THE DISCLOSURE

An off-take conveyor mechanism for removing coated stock from a coating apparatus suspends the coated material until the coating has solidified or dried. The off-take mechanism includes a system of conveyor belts and a system of fans directed to suspend the coated stock against the conveyor belts with the coated surface exposed to high velocity air from the fans. This arrangement provides for rapid cooling and drying from the coating and suspends the coated stock in the conveyor for removal from the coating apparatus.

CROSS REFERENCE TO RELATED APPLICATION

This application is a division of the copending application of Earl E. Crist and Lyman B. Furry, Ser. No. 673,179, filed Oct. 5, 1967.

BACKGROUND OF THE INVENTION

In the manufacture of cartons, boxes, and other containers of corrugated cardboard, there has been a substantial need for corrugated board having a completely waterproof coating. At the present, there are many manufacturers who provide corrugated board having wax coatings for water resistance but none who provide a completely waterproof board on any substantial scale. A completely waterproof corrugated board would be best prepared by coating with a hot melt plastic or a plastic lacquer which adheres well to the surface layer of the board and is thoroughly water repellent upon hardening or drying. Commercially available machines for coating paper, paperboard, corrugated cardboard, and the like, cannot operate at a high speed due to inherent limitations in the operation of the coating rollers and also due to difficulties encountered in drying the coatings or hardening the coatings rapidly enough to permit handling of the coated board.

Coating machines which are presently available use either bottom coating rollers or top coating rollers or combinations thereof for application of the desired coating to either the bottom, top, or both sides of the sheet or board being coated. The use of a bottom coating roller has generally resulted in the application of irregular coatings and has created special problems resulting from the tendency of the partially dry coating to stick to the conveyor means used to remove the coated board from the coating apparatus. Machines which use top coating rollers have the disadvantage of leakage of coating material around the coating rollers and also the tendency of the coating material to set upon the coating roller when it is stopped for any period of time. Machines which use combinations of bottom coating rollers and top coating rollers have both disadvantages. The problems which have arisen in coating machines, as described above, have emphasized the need for a conveyor off-take mechanism for coated materials which will support coated materials out of contact with the conveyor and effect a rapid cooling and drying of coating.

STATEMENT OF OBJECTS AND FEATURES OF THE INVENTION

It is, therefore, one object of this invention to provide a new and improved apparatus for conveying coated materials away from a coating apparatus while supporting materials with the coating out of contact with the conveyor and providing a rapid cooling or drying of the coating.

Another object of this invention is to provide an improved off take conveyor mechanism for removing stock having a freshly applied coating on the bottom surface thereof and supporting the coated stock with the coated surface out of contact with the conveyor and cooling or drying the coating.

A feature of this invention is the provision of a new and improved conveyor mechanism for removing stock having a coating applied to the bottom surface thereof in a coating apparatus and supporting a coated stock with the coating out of contact with the conveyor and including blower means for drying or cooling coated surface of the stock while withdrawing the same from the coating apparatus.

Another feature of this invention is the provision of a new and improved off-take conveyor apparatus for removing bottom coated stock from a coating apparatus and including blower means for supporting the coated stock with the coated surface out of contact with the conveyor withdrawing the stock from the apparatus.

Other objects and features of this invention will become apparent from time to time throughout the specification and claims as here and after related.

SUMMARY OF THE INVENTION

This apparatus comprises an off-take conveyor mechanism for removing bottom coated flat stock from a coating apparatus. The off-take conveyor mechanism is provided with blower means for floating the coated stock in a stream of air with the coated surface out of contact with the off-take conveyor whereby the stock is rapidly removed from the coating apparatus and the coated surface quickly cooled and dried. The air stream from the blowers, which are vertically disposed beneath the conveyor, support the coated stock against the conveyor and accelerates the drying or hardening of the coating while the conveyor removes the stock from the coating apparatus.

BRIEF DESCRIPTION OF THE DRAWINGS

In the accompanying drawings, to be taken as a part of this specification, there is illustrated a coating apparatus used in association with a conveyor which illustrates a preferred embodiment of the invention, in which drawings.

DESCRIPTION OF THE PREFERRED EMBODIMENT

Figure 1:
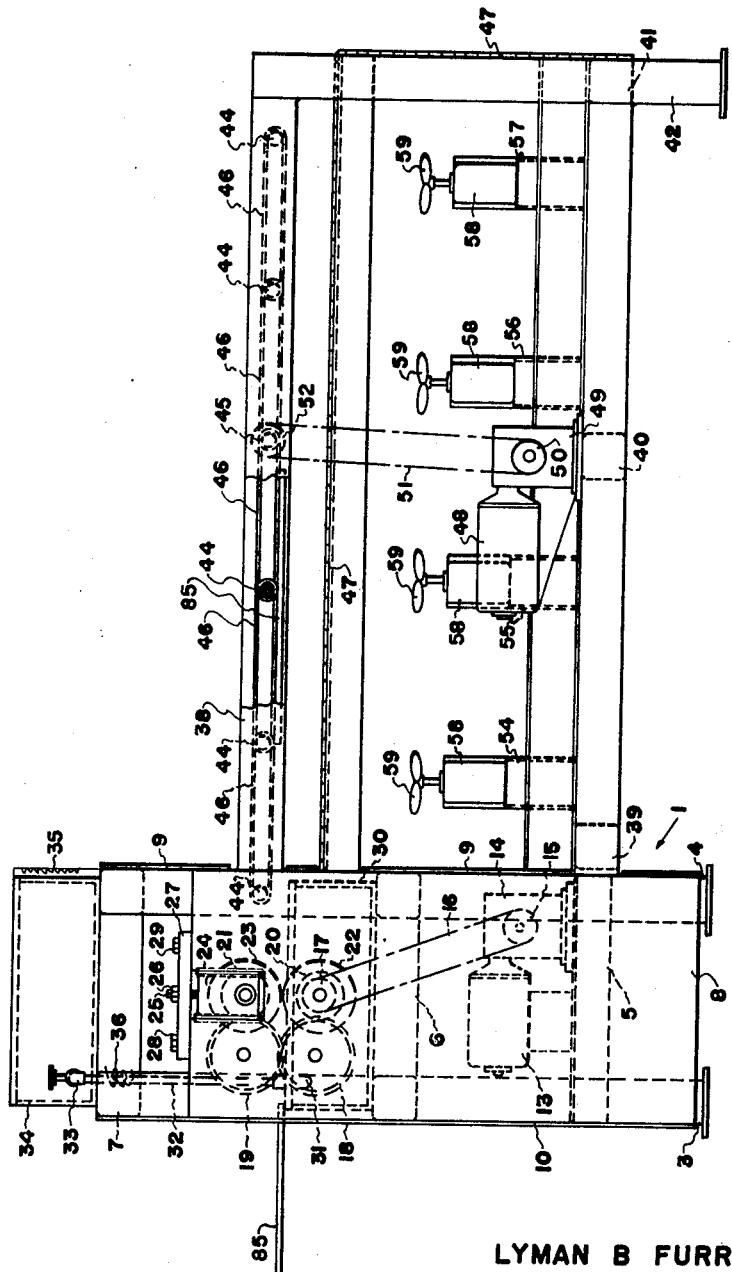
FIG. 1 is a view in elevation of a high speed plastic coating apparatus used in association with the novel off-take conveyor comprising this invention.
Figure 2:
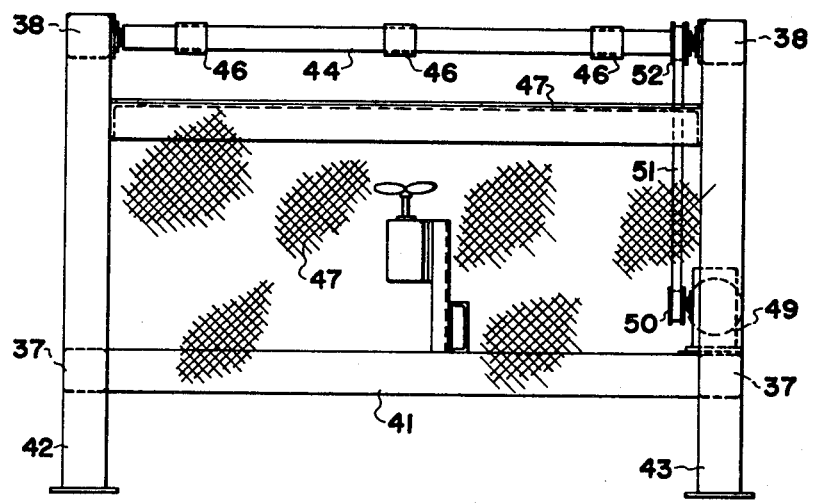
FIG. 2 is a view in right elevation of the end of the off-take conveyor of this invention as shown in FIG. 1.
Figure 3:
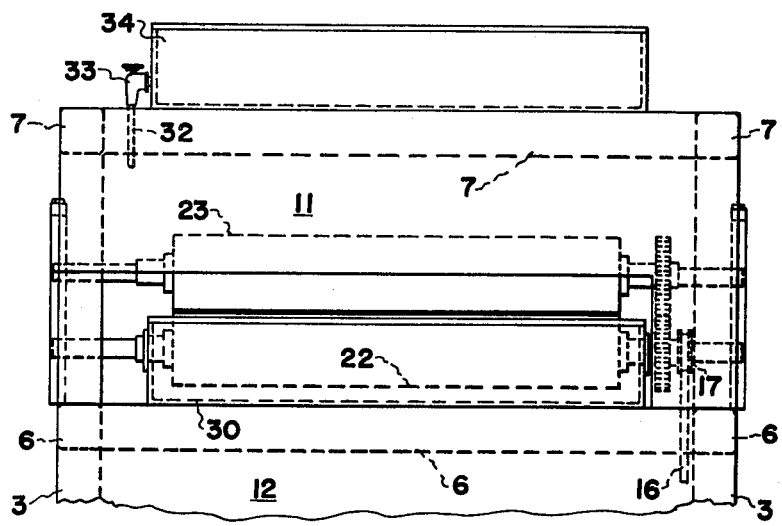
FIG. 3 is a fragmentary view in left elevation of the coating apparatus shown in FIG. 1.

Referring to the drawings by numerals of reference and more particularly to FIGS. 1 to 3, there is shown front and side elevations of a novel apparatus 1 for high speed application of plastic coating materials, preferably hot melt coating materials, to corrugated cardboard or similar stock material. Apparatus 1 has a welded angle iron (square tubing could be substituted for angle iron) framework and is covered with heavy gauge sheet metal panels. Apparatus 1 includes vertically extending angles 3 and 4 which, together with a similar set of angles at the rear of the apparatus, provide the vertical supports for the coating portion of the apparatus. At the lower end of the apparatus, there is provided a laterally extending angle iron 5 which provides a support for the motor driving the coating rollers. At approximately the midpoint of the apparatus vertically as viewed in FIG. 1, there are provided angle irons 6 welded to angle irons 3 and 4 which provide a support for the coating liquid reservoir which will be subsequently described. At the upper end of the apparatus as seen in FIG. 1, there are provided angle irons 7 welded to angle irons 3 and 4 and providing a support for tthe supply reservoir for the coating material. The apparatus is provided with sheet metal wall members 8, 9, 10, 11, and 12 which enclose the drive mechanism and coating rollers. The sheet metal wall members may be bolted or welded to the framework. It is preferred, however, that at least one wall be bolted to the framework to provide access to the apparatus for repair and maintenance.

At the lower portion of the apparatus, there is provided an electric motor 13 supported on angle iron 5 and arranged to drive variable speed gear box 14. Gear box 14 includes drive pulley 15 which operates belt 16 driving gear 17 of the coating applying portion of the apparatus. Gear 17 drives gears 18 and 19 which in turn drive gears 20 and 21 which rotate coating roller 22 and press roller 23, respectively. Press roller 23 is supported on a pair of movable plates 24 at opposite ends of the apparatus. Plates 24 are adjustably supported by screw member 25 and nut 26 on supporting plate 27. Supporting plate 27 is secured in place by bolts or screws 28 and 29, respectively. The vertical adjustment of press roller 23 permits variation in the thickness of the corrugated cardboard or other sheet stock being processed.

Coating roller 22 is supported for rotation in reservoir 30 which will be described in more detail later. Reservoir 30 has an inlet connection 31 connected to conduit 32 leading to outlet connection 33 on supply reservoir 34. The arrangement of angle irons 7 at the top of the apparatus provides the support on which supply reservoir 34 is located. Supply reservoir 34 is provided with a plurality of electric heaters 35 for maintaining the contents of the reservoir fluid. Likewise, conduit or tube 32 is provided with an electric heater, indicated diagrammatically as a heating coil 36, for maintaining the contents of the conduit fluid for supply to reservoir 30.

At the right side of the apparatus shown in FIG. 1, there is provided an off-take conveyor mechanism for removing the coated stock from the coating apparatus and protecting it until the coating has dried or hardened. The conveyor portion of the apparatus includes a plurality of supporting angle iron members (square tubing could also be used) 37 and 38 extending laterally as viewed in FIG. 1. There is also provided a plurality of angle iron members 39, 40, and 41 extending from front to back as viewed in FIG. 1. Supporting angle iron members 42 and 43 support the ends of members 37 and 38 and complete the supporting framework for the conveyor section.

Figure 8:
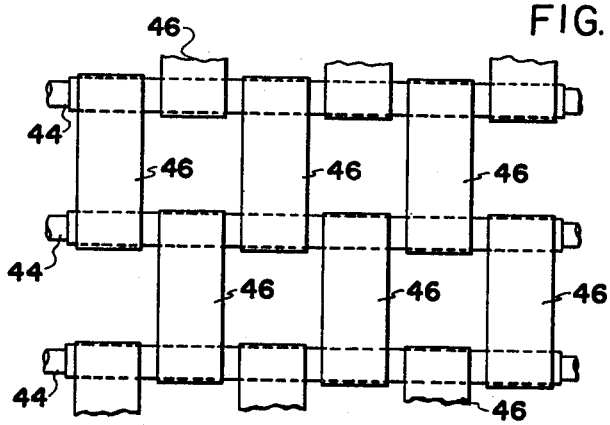
FIG. 8 is a detail fragmentary view of a portion of the conveyor belt system for removing coated stock from the apparatus.

At the upper end of the conveyor portion of the apparatus, there are provided a plurality of rollers 44 and a drive roller 45 which there are mounted conveyor belts 46 (seen in more detail in FIG. 8). Just beneath the conveyor belts 46 there is positioned a continuous coarse mesh screen 47 which extends longitudinally of the conveyor section and vertically at the right end of the conveyor section.

On angles 37 and 40 at the lower end of the conveyor portion, there is supported electric motor 48 which drives an adjustable gear box 49. Gear box 49 is provided with pulley 50 on which there is mounted belt 51 which drives pulley 52 on drive roller 45. Electric motor 48 is, therefore operable to rotate drive roll 45 and, operating through pulleys or belts 46, moves the entire system of belts to provide a continuously moving conveyor surface.

The lower portion of the conveyor apparatus also includes supporting channel member 53 on which there are supported vertically extending support members 54, 55, 56, and 57. On the support members 54, 55, 56, and 57, there are supported electric motors 58 driving fans 59. The plurality of fans 59 are operable to supply an upward current of air through screen 47 at a velocity sufficient to support the coated corrugated cardboard or other sheet stock against the moving conveyor belts 46. The velocity of air from fans 59 is sufficient to perform the dual function of supporting the coated stock against conveyor belts 46, with the coated surface positioned downward away from the conveyor belts, and to cool and harden the coating on the coated stock prior to its ejection at the right end of the apparatus as seen in FIG. 1.

Figure 5:
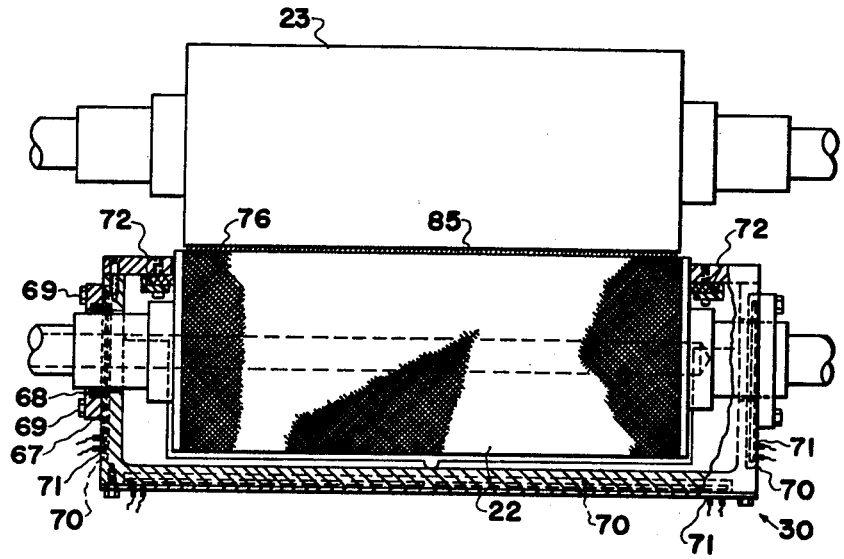
FIG. 5 is a broken sectional view of the reservoir for the plastic coating material and showing the relationship of the coating wheel and the press wheel.
Figure 6:
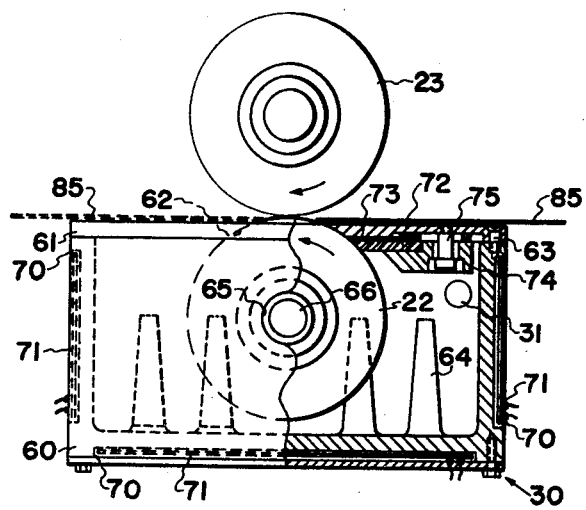
FIG. 6 is a view partially in section and partially in side elevation of the coating reservoir and coating wheel and press wheel shown in FIG. 5.

The details of the coating roller, press roller, and plastic coating material reservoir and associated apparatus are brought out more clearly in FIGS. 4 to 7 of the drawings. In FIG. 6, the reservoir 30 is shown as comprising a rectangular pot portion 60 having a lid 61 with a slot 62 through which the upper portion of coating roller 22 extends. Lid 61 is secured on reservoir 30 by a plurality of bolts or screws 63. Reservoir 30 is provided with a plurality of ribs 64 extending across the open reservoir and having a portion cut out to receive coating roller 22. This relationship of roller 22 and ribs 64 is seen more clearly in FIG. 4. Reservoir 30 also provided with a side aperture 65 through which shaft 66 extends supporting roller 22. A metal sealing ring 67 and plastic gasket 68 are secured to the side of reservoir 30 by a plurality of bolts 69. Ring 67 and gasket 68 seal opening 65 against leakage of the fluid or molten plastic coating material from the reservoir 30.

Plastic coating material reservoir 30 is provided with a plurality of recesses 70 in which there are positioned electric heater 71 for heating the walls of the reservoir. The electric heaters 71 are operable to maintain the temperature of reservoir 30 sufficient to maintain a molten thermoplastic coating material in a fluid condition or to maintain a thermoplastic lacquer at a lower viscosity for application to the stock being coated. The arrangement of electric heaters 71 in recesses 70 is essentially duplicated in the electric heater arrangement 35 used for heating reservoir 34 to maintain the contents fluid.

In FIG. 6, it is seen that cover 61 has a plastic gasket 72 which is preferably of a heat resistant thermoplastic material such as polytetrafluoroethylene (Teflon) positioned to engage the surface and sides of coating roller 22. Engagement of gasket 72 with the surface of roller 22 is seen in FIG. 6 while the engagement of the gasket with the sides of the coating roller is seen in FIG. 5. Teflon gasket 72 is pressed against the surface of coating roller 22 by metal springs 73 which also dresses the roller for an accurate coating of plastic material. Spring 73 and gasket 72 are secured in place by brackets 74 and screws 75.

Figure 4:
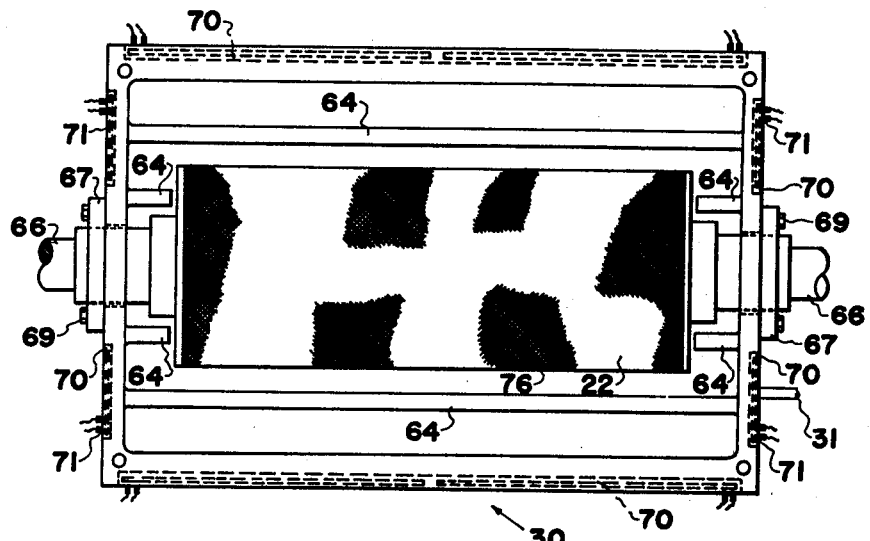
FIG. 4 is a plan view, with cover removed, of the reservoir and coating wheel for the plastic coating composition.
Figure 7:
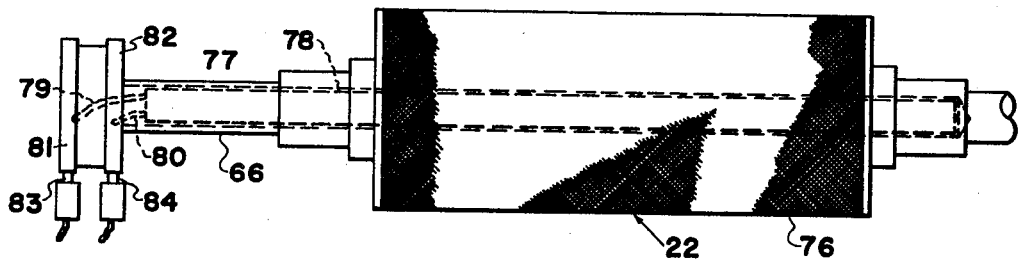
FIG. 7 is a detail view of the knurled plastic applicator wheel which is shown in the plastic coating material reservoir in FIGS. 5 and 6.

Coating roller 22 is seen in more detail in FIGS. 4, 5, and 7. Coating roller 22 has a coarsely knurled surface 76 which is formed of knurls having depth and spacing averaging from about 0.002–0.10 in. which facilitates picking up the fluid plastic coating material from the reservoir for application to the corrugated cardboard or other stock being processed. Shaft 66 for coating roller 22 is hollow as indicated at 77 and has a thermostatically controlled heater 78 positioned therein to maintain coating roller 22 at a temperature such that a molten hot melt thermoplastic coating material will be maintained fluid on the surface of the coating rollerup to the point of contact with the stock being processed. Heater 78 is connected by lead wires 79 and 80 to collector rings 81 and 82 which are engaged by electrical brushes 83 and 84 for connection to a source of electric power (not shown).

The reservoir 34 for thermoplastic coating material is heated by electric heaters 35 which are substantially the same as heaters 71. Reservoir 30 is heated by electric heater 71, as shown in FIGS. 4 to 6. Coating roller 22 is heated by electric heater 78 is previously described. This arrangement of heaters causes the hot melt thermoplastic coating material to be maintained fluid at all points in the apparatus up to the point of application to the corrugated cardboard or other flat stock being coated therein. The arrangement of ribs 64 and dressing gasket 72 and dressing spring 73 permits high speed operation of the coating wheel 22 without waste of the fluid thermoplastic coating material. This coating apparatus has been operated at extremely high speeds with no splashing of the molten thermoplastic coating material or loss of the coating material by centrifugal force from the coating roller.

During operation of this apparatus when a sheet of corrugated cardboard or other flat stock is fed between coating roller 22 and press roller 23, the thickness of the coating applied to the stock is determined by the extent of pressure exerted by press roller 23 and also by the positioning of spring 73 and gasket 72 for dressing the coating roller 22. The coarse knurled surface of coating roller 22 is operable to apply a substantial thickness of thermoplastic coating material to the stock being processed. The control of the thickness of the coating applied to the stock is largely accomplished by vertical adjustment of press roller 23 by adjusting screws 25, seen in FIG. 1. In FIG. 6, the stock to be printed is illustrated diagrammatically as sheet material 85 being fed from right to left through the apparatus.

OPERATION

The operation of this apparatus should be obvious from the description of the assembly and function of the component parts. Nevertheless, a summary of the operation may assist one in a more thorough understanding of the invention.

When the apparatus is to be operated, electric motor 13 is energized driving coating roller 22 and press roller 23. At the same time, electric motor 48 is driving conveyor belts 46 in the conveyor portion of the apparatus. The several fans 59 are also energized by their respective motors 58.

The press roller 23 is adjusted to a selected height in relation to coating roller 22 to provide the desired coating on stock 85 to be fed through the apparatus. The dressing spring 73 and gasket 72 may also be adjusted if desired to assist in determining the amount of coating applied. The electric heaters 35, 36, and 71 are energized to maintain the coating material fluid throughout the system. It should be noted that the electric circuits and switches for the heaters and for controlling the electric motors are simple rheostatic switches. The coating material which is used with this apparatus is preferably a hot melt material of the thermoplastic type which adheres tenaciously to the surface layer of corrugated cardboard or other sheet stock being processed. A preferred coating material used in this apparatus is a hot melt polyethylene or a hot melt adhesive such as Union Paste No. H90 hot melt adhesive manufactured by Union Paste Company. Any hot melt thermoplastic coating material may be used in this apparatus. It is also possible to use lacquer-type coating materials provided that the solvent for the lacquer is sufficiently volatile to be removed by the fans 59. It is preferred not to use lacquer-type coatings, however, due to the fire hazard which results from the evaporation of the solvent from the lacquer.

When press roller 23 is adjusted to the desired position and the dressing spring and gasket for coating roller 22 are adjusted as desired, the corrugated cardboard is fed into the apparatus. The rotation of rollers 22 and 23 act to feed the board 85 through the apparatus and to provide a coating of desired thickness on the lower surface of the cardboard. As the cardboard is ejected from the coating roller to the right as seen in FIG. 1, it is supported on the upwardly directed blasts of air from fans 59. The upwardly directed air blasts from fans 59 are operable to support the coated cardboard in the conveyor section of the apparatus. The air blasts from fans 59 are sufficient to support the cardboard pressed against the underside of conveyor belts 46 and conveyed along to the right, as viewed in FIG. 1, by the conveyor belts. The air blasts from fans 59 not only support the coated cardboard in the conveyor section with the coated surface positioned downward away from contact with the conveyor belts, but also function to harden or dry the coating on the cardboard. When the cardboard is ejected from the conveyor section to the right of FIG. 1, the thermoplastic coating is sufficiently hard or dry and is essentially non-tacky.

While the apparatus is complete, as shown, it may prove desirable to have moving belt or other suitable conveyor means positioned at the ejection end of the conveyor portion of the apparatus to convey the coated cardboard to a point of storage or to a point of further processing. If desired, the coated board may pass through a suitable conveyor arrangement to turn the board over in preparation for passing through another coating apparatus for applying a thermoplastic waterproof coating to the other saide of the cardboard. The several novel features which have been combined in this coating apparatus have resulted in the production of a high speed coating machine which has handled corrugated cardboard in widths up to sixty inches (wider sheets of cardboard can be processed on larger machines) at linear speeds up to 500 feet per minute. The conveyor apparatus described above is particularly useful in combination with the particular coating apparatus described. It should be understood however that the conveyor apparatus is of general application for coated flat stock and may be used for handling any type of bottom coated stock regardless of the coating apparatus used.

While this invention has been described fully and completely with special emphasis upon a preferred embodiment thereof, it should be understood that within the scope of the appended claim the invention may be practiced otherwise than as specifically described herein.

What is claimed is:

1. Conveyor apparatus for removing flat stock having a coating on its under surface from a coating apparatus, comprising a horizontally extending frame having a portion adapted to extend into the discharge end of said coating apparatus, a plurality of conveyor belts supported on said frame and extending horizontally outward from the discharge end of said coating apparatus and positioned to receive and convey freshly coated flat stock with the uncoated side of said stock contacting said belts,
a wire mesh screen supported on said frame and extending horizontally thereof below said conveyor belts, and
a plurality of fans positioned below said screen to direct high velocity air vertically against the underside of said coated stock to support the same in contact with said conveyor belts to harden or dry the coating while said stock is moved along said conveyor belts.

References Cited
UNITED STATES PATENTS

| | | | |
|---|---|---|---|
| 764,561 | 7/1904 | Cohen | 34—156 XR |
| 1,951,004 | 3/1934 | Willis | 34—156 |
| 2,281,496 | 4/1942 | Hanson | 34—156 |
| 3,175,300 | 3/1965 | Nitchie | 34—156 XR |
| 3,226,840 | 1/1966 | Moser et al. | 34—156 XR |

KENNETH W. SPRAGUE, Primary Examiner